(12) United States Patent
Yun et al.

(10) Patent No.: US 10,767,113 B2
(45) Date of Patent: Sep. 8, 2020

(54) LIQUID CRYSTAL COMPOUND CONTAINING 2,3,4-TRISUBSTITUTED BENZENE AND COMPOSITION THEREOF

(71) Applicant: SHIJIAZHUANG CHENGZHI YONGHUA DISPLAY MATERIAL CO.,LTD., Shijiazhuang, Hegei Prov. (CN)

(72) Inventors: Guoliang Yun, Shijiazhuang (CN); Hongmei Cui, Shijiazhuang (CN); Mingxia Wang, Shijiazhuang (CN); Sumin Kang, Shijiazhuang (CN); Yongtao Zhang, Shijiazhuang (CN); Yong Chen, Shijiazhuang (CN)

(73) Assignee: SHIJIAZHUANG CHENGZHI YONGHUA DISPLAY MATERIAL CO., LTD., Shijiazhuang, Hebei Prov. (CN)

(*) Notice: Subject to any disclaimer, the term of this patent is extended or adjusted under 35 U.S.C. 154(b) by 135 days.

(21) Appl. No.: 15/714,234

(22) Filed: Sep. 25, 2017

(65) Prior Publication Data

US 2018/0094191 A1    Apr. 5, 2018
US 2019/0390113 A9    Dec. 26, 2019

(30) Foreign Application Priority Data

Sep. 29, 2016 (CN) .......................... 2016 1 0862010

(51) Int. Cl.

| G02F 1/1333 | (2006.01) |
|---|---|
| C09K 19/34 | (2006.01) |
| C09K 19/04 | (2006.01) |
| C09K 19/30 | (2006.01) |
| G02F 1/137 | (2006.01) |
| C09K 19/12 | (2006.01) |

(52) U.S. Cl.
CPC .......... *C09K 19/3402* (2013.01); *C09K 19/04* (2013.01); *C09K 19/3003* (2013.01); *G02F 1/137* (2013.01); *C09K 2019/0437* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01); *C09K 2019/3025* (2013.01); *C09K 2019/3027* (2013.01); *C09K 2019/3096* (2013.01); *C09K 2019/3422* (2013.01); *G02F 2001/13706* (2013.01)

(58) Field of Classification Search
CPC ............... C09K 19/3402; C09K 19/04; C09K 19/3003; C09K 2019/0437; C09K 2019/0466; C09K 2019/122–124; C09K 2019/3004; C09K 2019/3009; C09K 2019/301; C09K 2019/3016; C09K 2019/3021; C09K 2019/3025; C09K 2019/3027; C09K 2019/3096; C09K 2019/3422; G02F 1/1333; G02F 1/137; G02F 2001/13706
USPC ..................................................... 252/299.63
See application file for complete search history.

(56) References Cited

U.S. PATENT DOCUMENTS 9,234,136 B2 * 1/2016 Archetti ................. C09K 19/56
10,017,694 B2 * 7/2018 Gao .................... C09K 19/3003

FOREIGN PATENT DOCUMENTS

DE    42 34 585 C1 * 10/1992   ............. C09K 19/06
DE    44 09 724 A1 *  3/1994   ............... G02F 1/13

* cited by examiner

*Primary Examiner* — Geraldina Visconti
(74) *Attorney, Agent, or Firm* — Muncy, Geissler, Olds & Lowe, P.C.

(57) ABSTRACT

Provided is a liquid crystal compound containing 2,3,4-trisubstituted benzene, a liquid crystal composition thereof, and a liquid crystal display element or a liquid crystal display comprising the liquid crystal compound or the liquid crystal composition, wherein the liquid crystal composition has a lower viscosity, can achieve a quick response, and further has a moderate dielectric anisotropy $\Delta\varepsilon$, a moderate optical anisotropy $\Delta n$, and high stability to heat and light. The liquid crystal display element or liquid crystal display comprising the liquid crystal composition has the properties of a wider nematic phase temperature range, an appropriate birefringence anisotropy, a very high electrical resistivity, a good ultraviolet resistant property, a high charge retention rate, a low vapor pressure etc., and particularly, the liquid crystal compound or the liquid crystal composition has the advantage of a high light transmittance.

15 Claims, No Drawings

LIQUID CRYSTAL COMPOUND CONTAINING 2,3,4-TRISUBSTITUTED BENZENE AND COMPOSITION THEREOF

TECHNICAL FIELD

The present invention relates to the liquid crystal display field, and particularly relates to a liquid crystal compound containing 2,3,4-trisubstituted benzene, a liquid crystal composition thereof, and a liquid crystal display element or liquid crystal display comprising the liquid crystal compound or composition.

BACKGROUND ART

At present, the expansion of application range of liquid crystal compounds becomes larger and larger, and the liquid crystal compounds can be used in various types of displays, electro-optical devices, sensors and the like. There are a great variety of liquid crystal compounds used in the above-mentioned display field, wherein nematic liquid crystals are used most extensively. Nematic liquid crystals have been used in passive TN and STN matrix displays and systems having a TFT active matrix.

With regard to the application field of thin film transistor techniques (TFT-LCD), although the market in recent years has become very huge, and the techniques also become gradually mature, requirements of display techniques are increasing continuously, especially in terms of achieving a quick response, reducing the drive voltage for reducing power consumption, etc. Liquid crystal materials, as one of the important optoelectronic materials for liquid crystal displays, play an important role in improving the performance of a liquid crystal display.

As liquid crystal materials, they need to have good chemical and thermal stabilities and stabilities to electric fields and electromagnetic radiations. Moreover, as liquid crystal materials used for thin film transistor techniques (TFT-LCD), they not only need to have the stabilities as mentioned above, but also should have properties, such as a broader nematic phase temperature range, a suitable birefringence anisotropy, a very high electrical resistivity, a good ultraviolet resistant property, a high charge retention rate, a low vapor pressure, etc.

As for the application of dynamic picture displays, elimination of ghosting and trailing of display pictures, the liquid crystal is required to have a very fast response speed, and therefore the liquid crystal is required to have a lower rotary viscosity $\gamma_1$; in addition, for portable devices, the driving voltage of liquid crystal is desired to be as low as possible, in order to reduce the equipment energy consumption, and for displays for use in televisions, the requirements of drive voltage of the liquid crystals are not as low as that.

The viscosity, in particular rotary viscosity $\gamma_1$, of a liquid crystal compound directly affects the response time after the liquid crystal is energized, and both the rise time ($t_{on}$) and fall time ($t_{off}$) are proportional to the rotary viscosity $\gamma_1$ of the liquid crystal; moreover, since the rise time ($t_{on}$) is related to a liquid crystal cell and the drive voltage, it can be adjusted by means of increasing the drive voltage and reducing the thickness of the liquid crystal cell; while the fall time ($t_{off}$) is irrelevant to the drive voltage, but is mainly related to the elastic constant of the liquid crystal and the thickness of the liquid crystal cell, and a decrease in cell thickness can result in a decrease in fall time ($t_{off}$); moreover, in different display modes, the movement manners of liquid crystal molecules are different, and the three modes TN, IPS and VA are inversely proportional to the mean elastic constant K, twist elastic constant and bend elastic constant, respectively.

According to the continuum theory of liquid crystal, a variety of different liquid crystals deformed under the action of an external force (an electric field, a magnetic field) can "rebound" back to the original shapes by intermolecular interactions; likewise, liquid crystals also form a "viscosity" due to the intermolecular force. Small changes of liquid crystal molecules may result in obvious changes in the conventional parameter performance of the liquid crystal, wherein for some of these changes, there is a certain rule, while for some changes, it is difficult to find a rule, which may also have obvious effects on the intermolecular interaction of the liquid crystal, these effects are very subtle, and to date, no perfect theoretical explanation has been formed yet.

The viscosity of a liquid crystal is related to the molecular structure of the liquid crystal, and studying the relationship between the viscosity of a liquid crystal system formed from different liquid crystal molecules and the molecular structures of the liquid crystals is one of important tasks of liquid crystal formulation engineers.

The reason why a liquid crystal display panel has a high energy consumption is that only about 5% of backlight can transmit through a display device and then be captured by human eyes, while most of the light is "wasted". If a liquid crystal having a high light transmittance can be developed, then the backlight intensity can be reduced, thereby achieving the purpose of saving energy consumption and extending the service time of a device.

SUMMARY OF THE INVENTION

An object of the present invention is to provide a liquid crystal compound containing 2,3,4-trisubstituted benzene, a liquid crystal composition, and a liquid crystal display element or a liquid crystal display comprising the liquid crystal compound or the liquid crystal composition, wherein the liquid crystal composition has a lower viscosity, can achieve a quick response, and further has a moderate dielectric anisotropy Δε, a moderate optical anisotropy Δn, and high stability to heat and light. The liquid crystal display element or liquid crystal display comprising the liquid crystal composition has the properties of a wider nematic phase temperature range, an appropriate birefringence anisotropy, a very high electrical resistivity, a good ultraviolet resistant property, a high charge retention rate, a low vapor pressure etc., and particularly, the liquid crystal compound or the liquid crystal composition has the advantage of a high light transmittance.

In order to achieve the above-mentioned beneficial technical effects, the present invention provides a liquid crystal composition, characterized in that the liquid crystal composition comprises one or more compounds of formula I and one or more compounds of formula II, and said liquid crystal composition at least further comprises one or two compounds of formula II-B included in formula II,

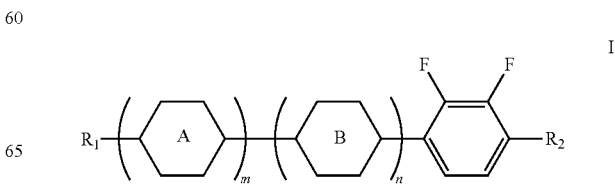

-continued

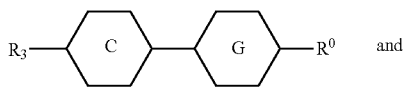

and

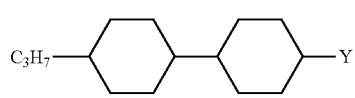

wherein $R_0$, $R_1$ and $R_3$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more non-connected $CH_2$ in the groups represented by $R_0$, $R_1$ and $R_3$ may be substituted with cyclobutyl, cyclopropyl or —O—;

Y represents ethyl or vinyl;

$R_2$ represents F, $OCF_3$, $OCHF_2$ or $OCH_2F$;

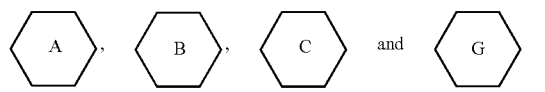

each independently represent one of

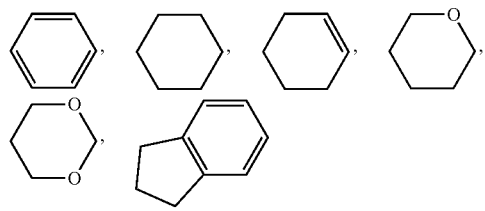

and any fluorobenzene; and m and n each independently represent 1 or 2.

The compounds represented by formula I where m and n are both 1 are tricyclic compounds, which have better solubility and can be added in more portions, such as 10%, to the liquid crystal, and also have lower viscosities; where one of m and n represents 2, the compounds are tetracyclic compounds, which have a very high clearing point and are very helpful in improving the clearing point of the liquid crystal, but have poorer solubility, so that the addition amount is generally smaller, e.g., 5%; and where m and n are both 2, the compounds have a very high clearing point but the solubility are further reduced, so the addition amount is, for example, 1%. With the difference of ring number, the performances of liquid crystals may show some differences; however, if combined with formula II-B, they all have an increased transmittance, and also have properties such as a very low viscosity, and are especially suitable for IPS display mode.

Said one or more compounds represented by formula I are preferably one or more of compounds represented by formulas I1 to I24; said compounds represented by formula II comprise preferably one or more compounds represented by formulas II1 to II10; and said one or two compounds represented by formula II-B are preferably one or two of compounds represented by formulas II-B-1 and II-B-2,

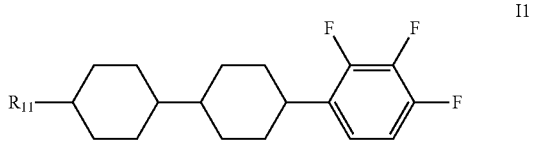

I1

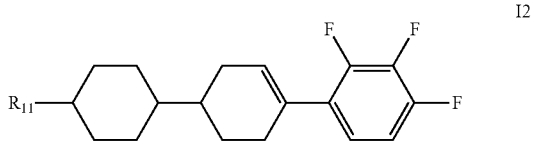

I2

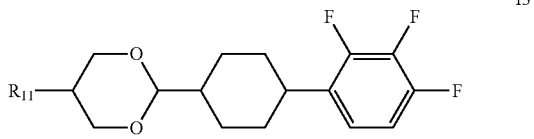

I3

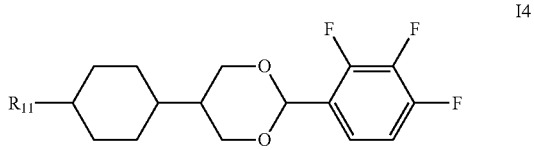

I4

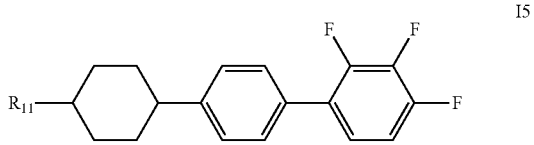

I5

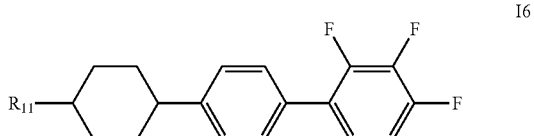

I6

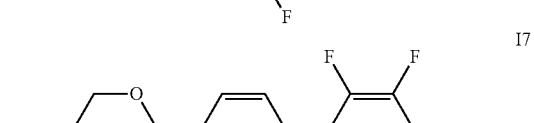

I7

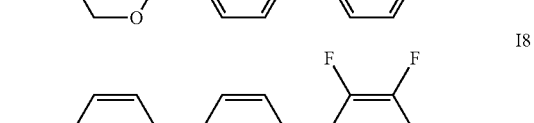

I8

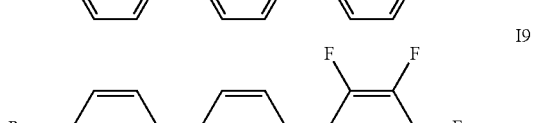

I9

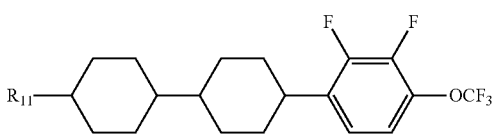

I10

I11 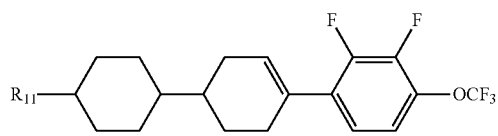
I12 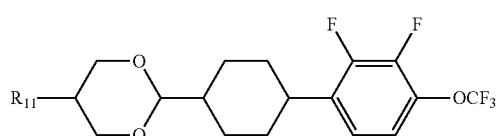
I13 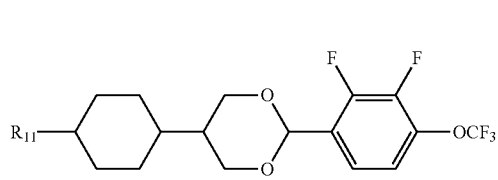
I14 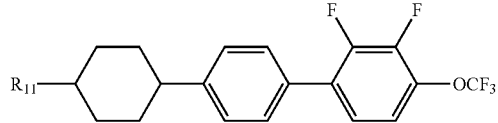
I15 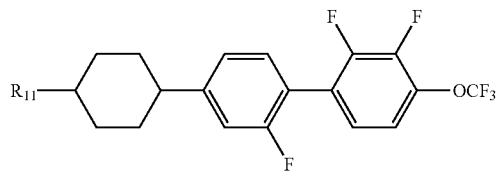
I16 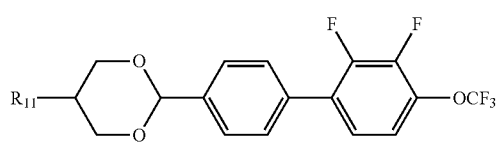
I17 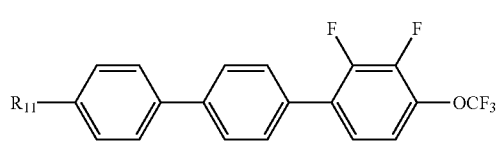
I18 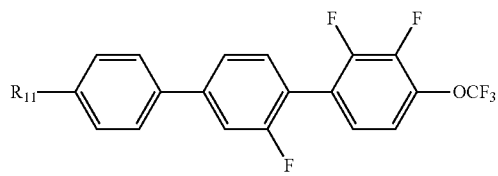
I19 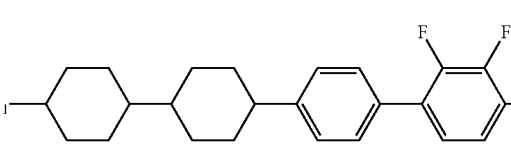
I20 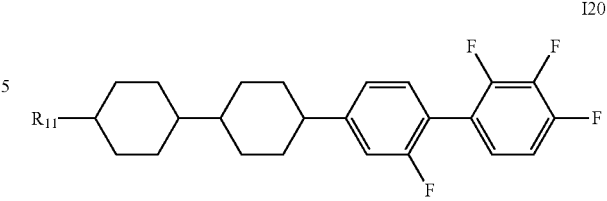
I21 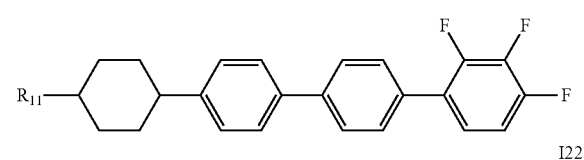
I22 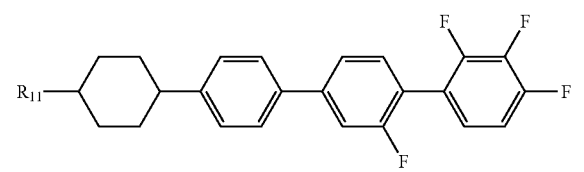
I23 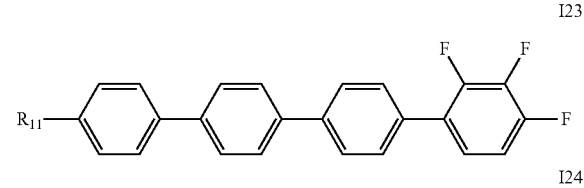
I24 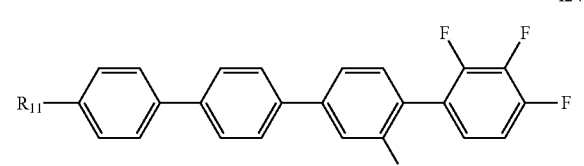
II-B-1 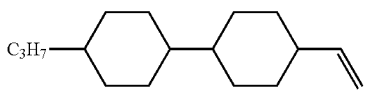
II-B-2 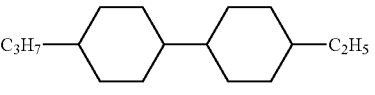
II-1 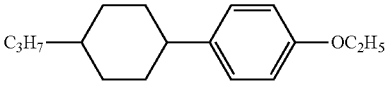
II-2 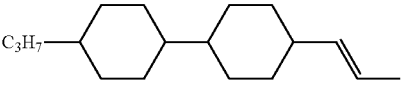
II-3 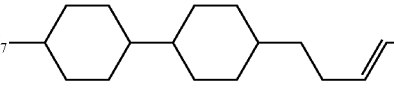
II-4 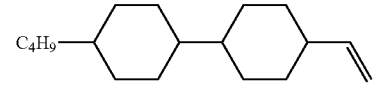
II-5 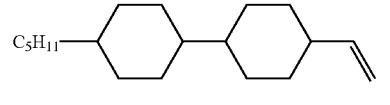

-continued

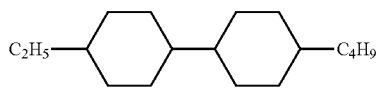
II-6

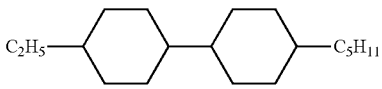
II-7

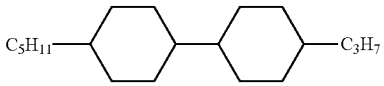
II-8

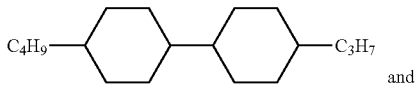
II-9
and

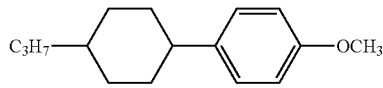
II-10 wherein $R_{11}$ each independently represents an alkyl having a carbon atom number of 1-6 or an alkenyl group having an atom number of 2-6.

In said liquid crystal composition, the content in mass percentage of the compounds represented by formula I is preferably 0.5-50%, the content in mass percentage of the compounds represented by formula II-B is preferably 5-65%, and the content in mass percentage of the one or more compounds represented by formula II except the compounds represented by formula II-B is 0-30%.

The liquid crystal composition provided by the present invention may be a positive liquid crystal composition, and said liquid crystal composition further comprises one or more compounds represented by formula III

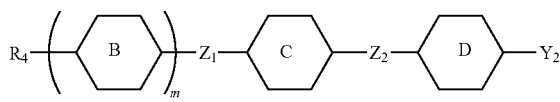
III wherein $R_4$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or an fluoro-substituted alkenoxy group having a carbon atom number of 3-8; and any one or more $CH_2$ in $R_4$ may be substituted with cyclopentyl, cyclobutyl or cyclopropyl;

each independently represent:
one or two of

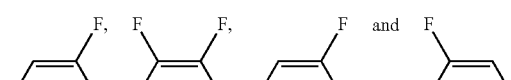

m represents 1 or 2;

$Z_1$ and $Z_2$ each independently represent a single bond, —$CF_2O$—, —$CH_2CH_2$— or —$CH_2O$—; and $Y_2$ represents F, a fluoro-substituted alkyl group having a carbon atom number of 1-5, a fluoro-substituted alkoxy group having a carbon atom number of 1-5, a fluoro-substituted alkenyl group having a carbon atom number of 2-5, or a fluoro-substituted alkenoxy group having a carbon atom number of 3-8.

Said one or more compounds represented by formula III are preferably compounds of formulas III-1 to III-26

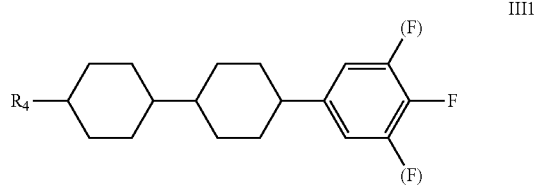
III1

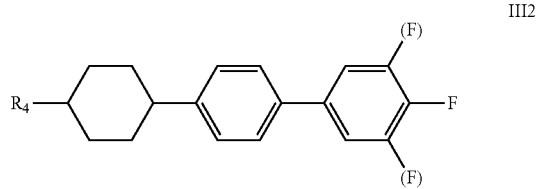
III2

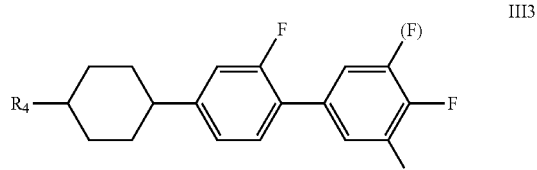
III3

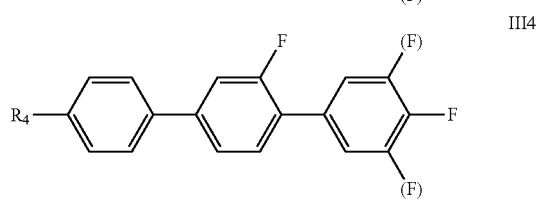
III4

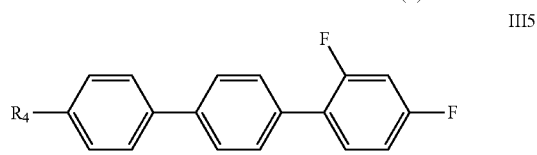
III5

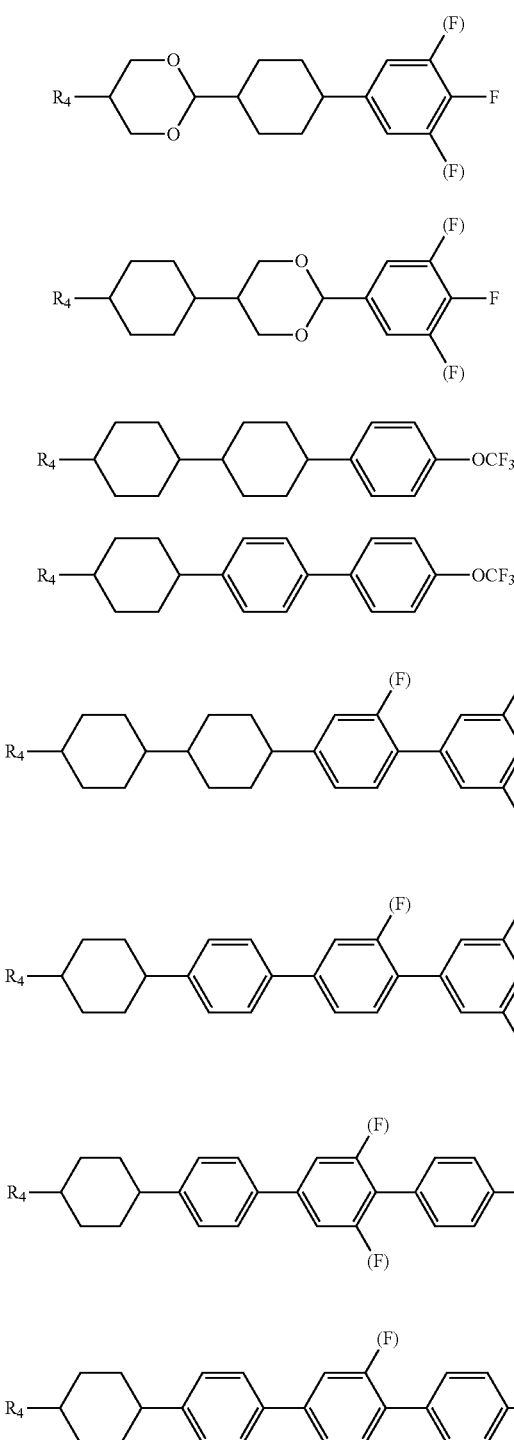
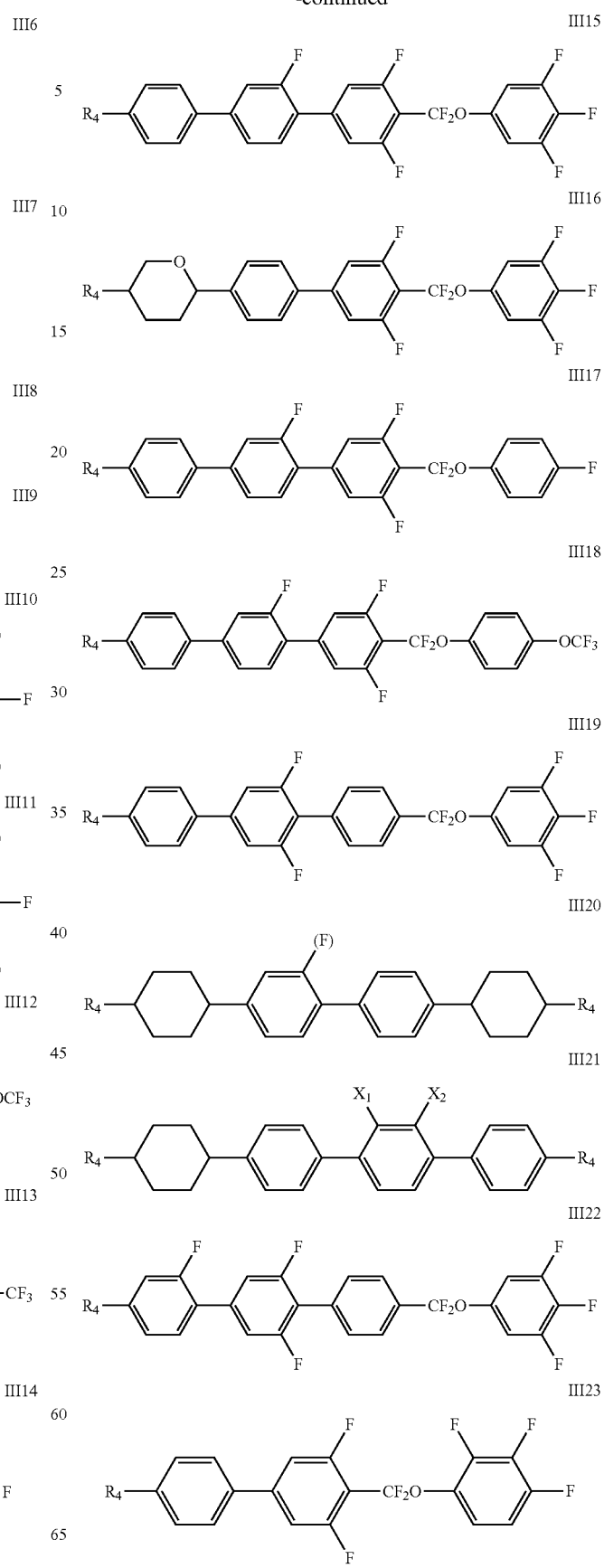

-continued

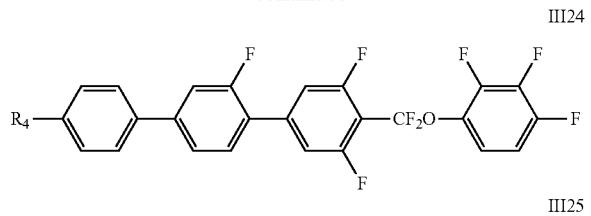
III24

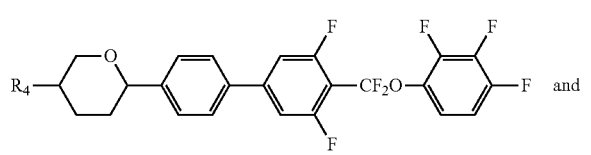
III25

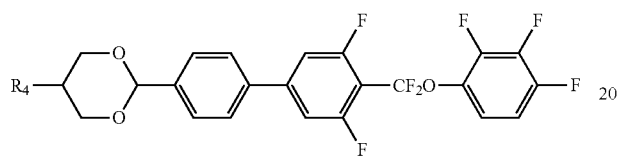
III26 wherein $X_1$ and $X_2$ each independently represent H or F, but can be neither F nor H at the same time in the same molecular formula;

$R_4$ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any $CH_2$ in the groups represented by $R_4$ may be substituted with cyclopentyl, cyclobutyl or cyclopropyl;

the (F)s each independently represent H or F; and $Y_2$ each independently represents F, a fluoro-substituted alkyl group having a carbon atom number of 1-5, a fluoro-substituted alkoxy group having a carbon atom number of 1-5, a fluoro-substituted alkenyl group having a carbon atom number of 2-5, or a fluoro-substituted alkenoxy group having a carbon atom number of 3-8.

The liquid crystal composition provided by the present invention may also be a negative liquid crystal composition, and said liquid crystal composition further comprises one or more compounds represented by formula IV

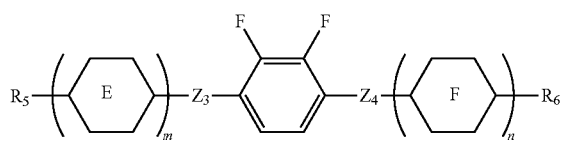
IV wherein $R_5$ and $R_6$ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any $CH_2$ in the groups represented by $R_5$ and $R_6$ may be substituted with cyclopentyl, cyclobutyl or cyclopropyl;

$Z_3$ and $Z_4$ each independently represent a single bond, —$CH_2CH_2$— or —$CH_2O$—;

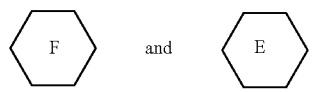

each independently represent one or more of

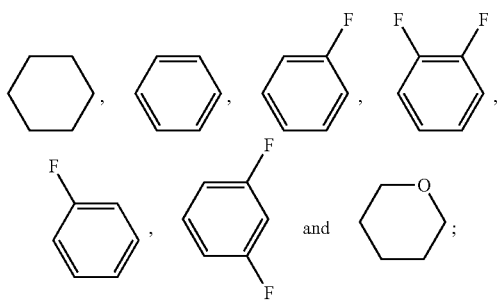

m represents 1 or 2;

n represents 0, 1 or 2.

Said one or more compounds represented by formula IV may be one or more of compounds represented by formulae IV1 to IV11

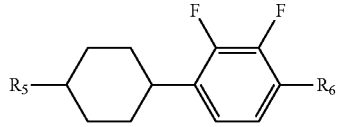
IV1

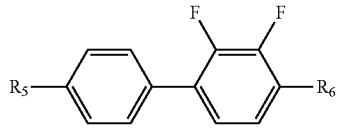
IV2

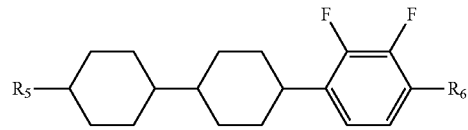
IV3

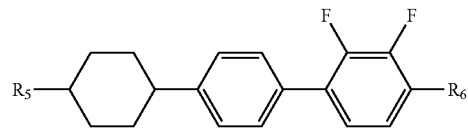
IV4

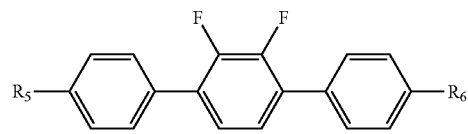
IV5

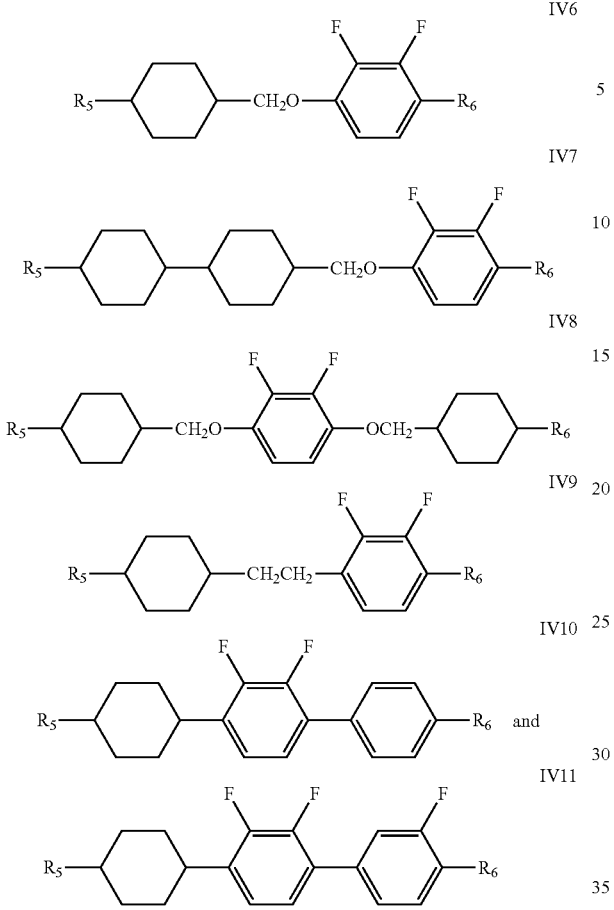

wherein $R_5$ and $R_6$ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any $CH_2$ in the groups represented by $R_5$ and $R_6$ may be substituted with cyclopentyl, cyclobutyl or cyclopropyl.

Said positive or negative liquid crystal composition may further comprise one or more compounds represented by formula V

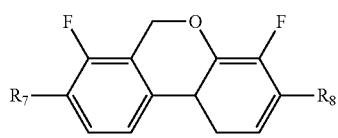

wherein $R_7$ and $R_8$ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any $CH_2$ in the groups represented by $R_7$ and $R_8$ may be substituted with cyclopentyl, cyclobutyl or cyclopropyl.

The liquid crystal composition provided by the present invention may further comprise one or more compounds represented by formula VI:

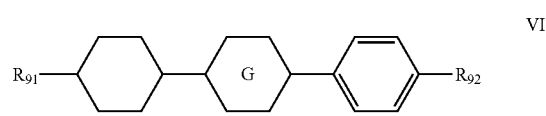

wherein $R_{91}$ represents an alkyl group having a carbon atom number of 1-5 or an alkenyl group having a carbon atom number of 2-5;

$R_{92}$ represents an alkyl group having a carbon atom number of 1-5, an alkoxy group having a carbon atom number of 1-5 or an alkenyl group having a carbon atom number of 2-5; and

represents

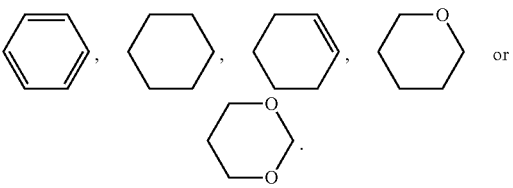

The present invention further relates to a liquid crystal compound represented by formula I-A

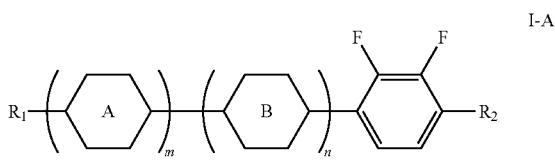

wherein $R_1$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more non-connected $CH_2$ in the groups represented by $R_1$ may be substituted with cyclopentyl, cyclobutyl, cyclopropyl or —O—;

Y represents ethyl or vinyl;

m and n each independently represent 1 or 2; and one or two of

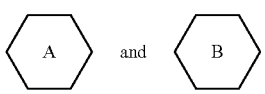
respresents
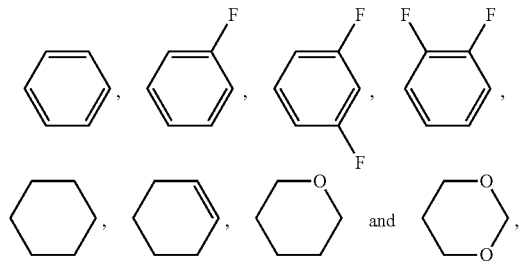
with the proviso that when m+n=2,
represents
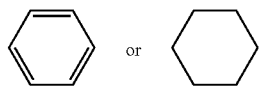
and when $R_2$ represents F,
cannot represent
.
The liquid crystalline compounds represented by formula I-A are preferably compounds represented by formulas I2 to I4 and I6 to I24
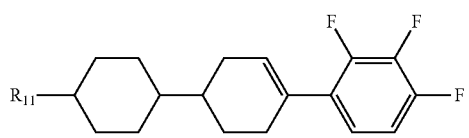
I2
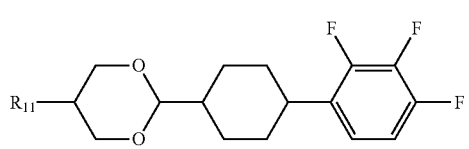
I3
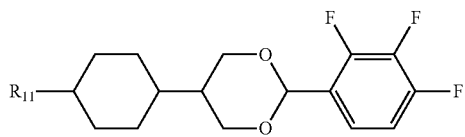
I4
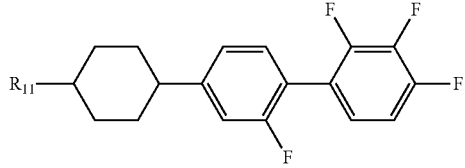
I6
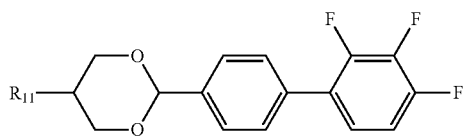
I7
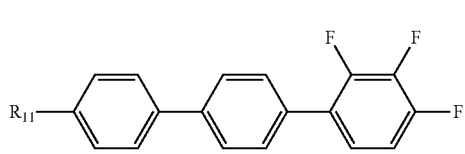
I8
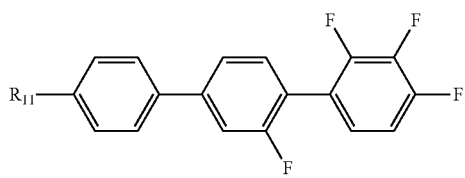
I9
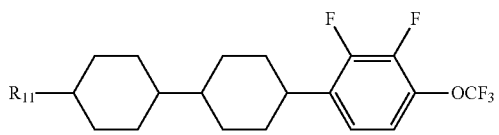
I10
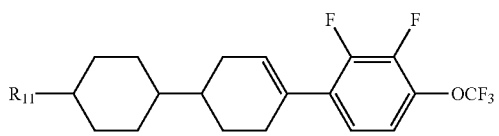
I11
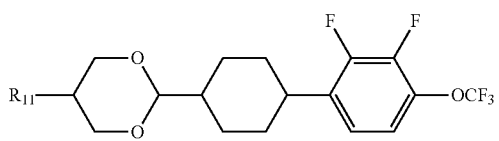
I12
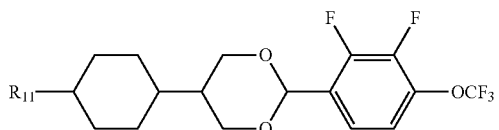
I13
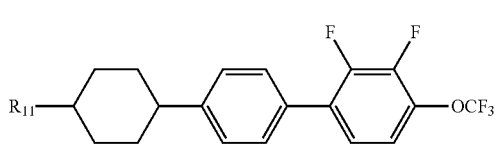
I14

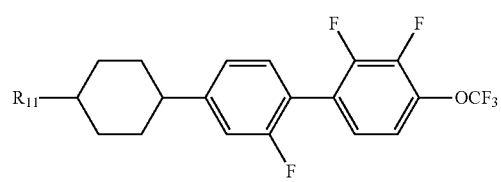

I15

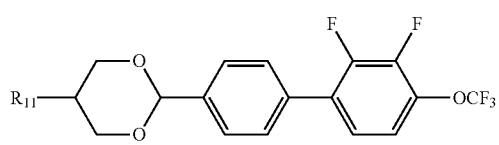

I16

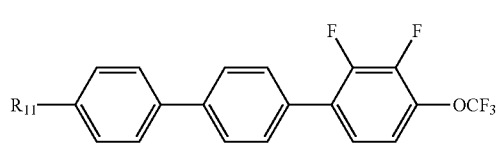

I17

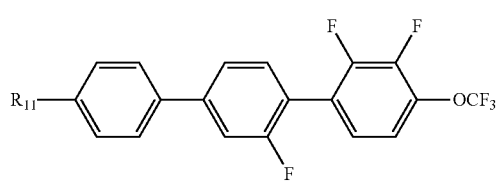

I18

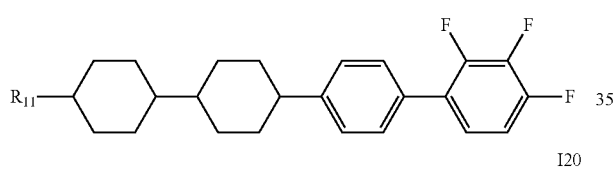

I19

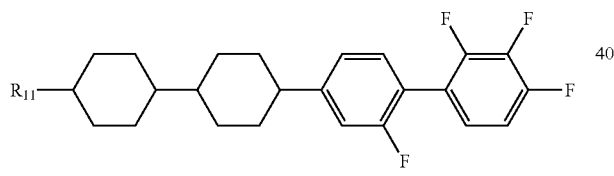

I20

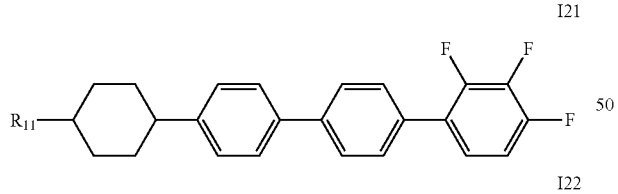

I21

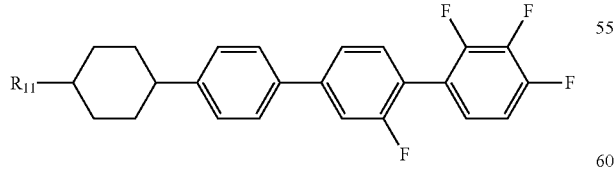

I22

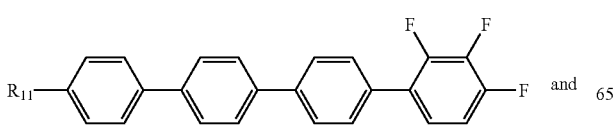

I23 and

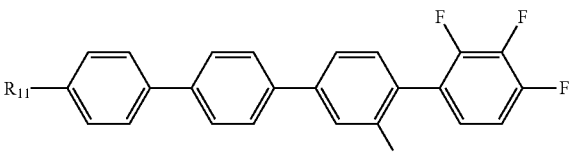

I24

The compounds of formula I-A of the present invention have a low viscosity, a wider refractive index range, a medium positive dielectric anisotropy, and a greater refractive index in the perpendicular direction, and are stable to light and heat, so these compounds are a range of common liquid crystalline compounds for improving the dielectric anisotropy in the perpendicular direction without improving the dielectric anisotropy in the parallel direction too much.

In the formula, $R_{11}$ each independently represents an alkyl having a carbon atom number of 1-6 or an alkenyl group having an atom number of 2-6.

The present invention further relates to a liquid crystal display element or liquid crystal display comprising the liquid crystal compound or liquid crystal composition of any one of claims 1-9, wherein said liquid crystal display element or liquid crystal display is an active matrix display element or display or a passive matrix display element or display.

Synthesis Method:

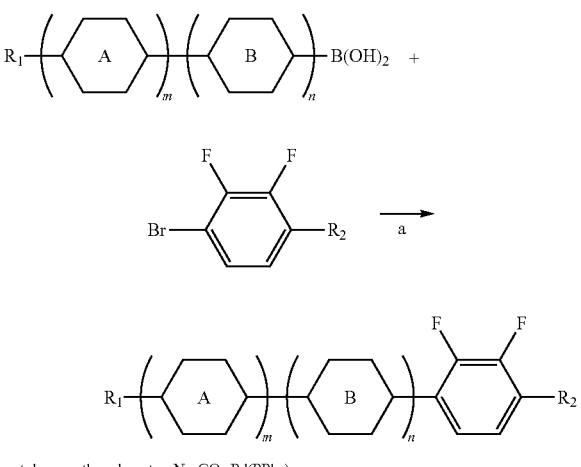

a: toluene, ethanol, water, $Na_2CO_3$ $Pd(PPh_3)_4$

The liquid crystal compound of the invention is simple in synthesis and low in cost; has a moderate dielectric property, particularly greater perpendicular and parallel dielectric properties, a low viscosity, and a refractive index in a wider range; and can also be used for liquid crystals in various display modes.

To the liquid crystal compound and the liquid crystal composition provided by the present invention, various functional dopants may be added, wherein the contents of the dopants are preferably between 0.01% and 1%, and these dopants are mainly an antioxidant, an ultraviolet absorber, and a chiral agent.

The antioxidant and the ultraviolet absorber are preferably:

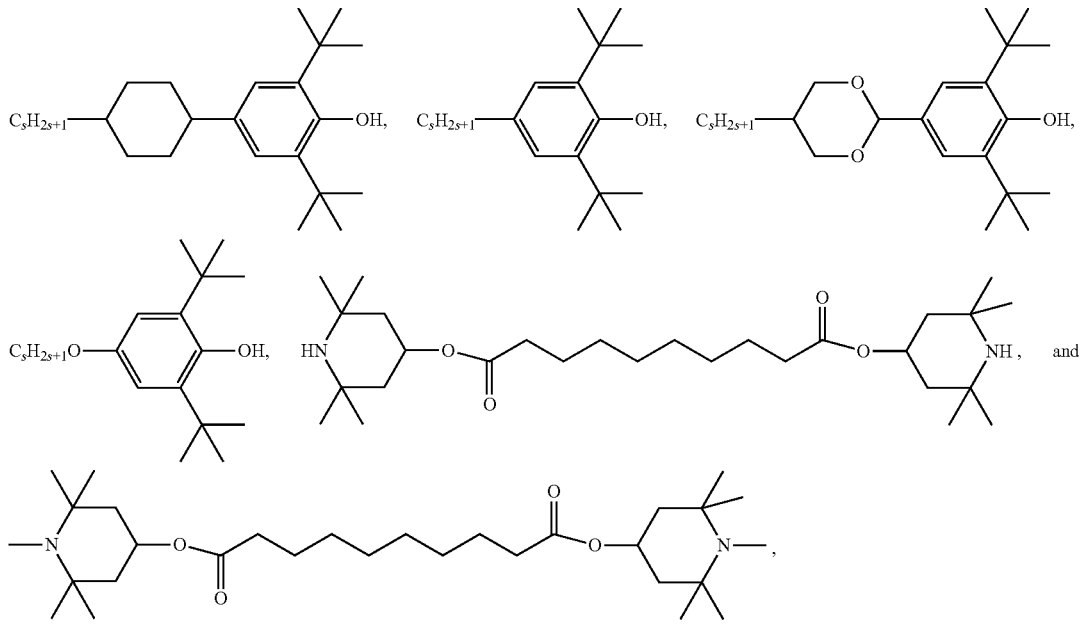

S representing an integer of from 1 to 100.

The chiral additive is preferably (levorotary or dextrorotary):

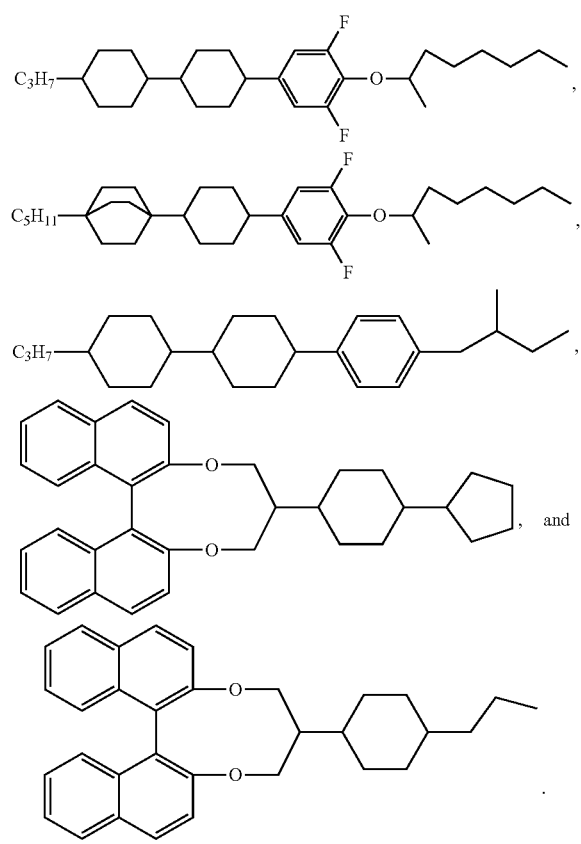

wherein the liquid crystal composition has a lower viscosity, can achieve a quick response, and further has a moderate dielectric anisotropy $\Delta\varepsilon$, a moderate optical anisotropy $\Delta n$, and high stability to heat and light. The liquid crystal display element or liquid crystal display comprising the liquid crystal composition has the properties of a wider nematic phase temperature range, an appropriate birefringence anisotropy, a very high electrical resistivity, a good ultraviolet resistant property, a high charge retention rate, a low vapor pressure etc., and particularly, the liquid crystal compound or the liquid crystal composition has the advantage of a high light transmittance.

DETAILED DESCRIPTION OF EMBODIMENTS

The present invention is further described as below in combination with particular embodiments, but the present invention is not limited to the following embodiments. Said methods, if not otherwise indicated, are all conventional methods. Said raw materials, if not otherwise indicated, can all be available through public commercial approaches.

The reaction process is generally monitored through TLC, and the post-treatments after the reaction is completed are generally water washing, extracting, combining organic phases and then drying, evaporating and removing the solvent under a reduced pressure, recrystallization and column chromatographic separation; and a person skilled in the art would be able to achieve the present invention according to the following description.

In the present specification, the percentages are mass percentages, the temperatures are in degree Celsius (° C.), and the specific meanings of other symbols and the test conditions are as follows:

Cp represents the clearing point (° C.) of the liquid crystal measured by a DSC quantitative method;

S-N represents the melting point (° C.) of the liquid crystal from a crystal state to a nematic phase;

$\Delta n$ represents the optical anisotropy, no is the refractive index of an ordinary light, ne is the refractive index of an extraordinary light, the test conditions are 25±2° C. and 589 nm, and an Abbe refractometer is used for the test;

Δε represents the dielectric anisotropy, Δε=ε//−ε™, wherein ε// is a dielectric constant parallel to a molecular axis, and ε™ is a dielectric constant perpendicular to the molecular axis, the test condition is 25±0.5° C., a 20-micron parallel cell is used, and INSTEC: ALCT-IR1 is used for the test;

γ1 represents a rotary viscosity (mPa·s), the test condition is 25±0.5° C., a 20-micron parallel cell is used, and INSTEC: ALCT-IR1 is used for the test; and ρ represents an electrical resistivity (Ω·cm), the test condition is 25±2° C., and the test instruments are a TOYO SR6517 high resistance instrument and an LE-21 liquid electrode.

VHR represents a voltage holding rate (%), and the test condition is 20±2°, a voltage of ±5 V, a pulse width of 10 ms, and a voltage holding time of 16.7 ms. The test equipment is a TOYO Model 6254 liquid crystal performance comprehensive tester.

τ represents a response time (ms), the test instrument is DMS-501, the test condition is 25±0.5° C., the test cell is a 3.3 micron IPS test cell, both the electrode spacing and the electrode width are 10 microns, and the included angle between the frictional direction and the electrode is 10°.

T (%) represents a transmissivity, T (%)=100%*bright state (Vop) luminance/light source luminance, the test equipment is DMS501, the test condition is 25±0.5° C., the test cell is a 3.3 micron IPS test cell, both the electrode spacing and the electrode width are 10 microns, and the included angle between the frictional direction and the electrode is 10°.

In the examples of the present invention application, liquid crystal monomer structures are represented by codes, wherein the code representation of cyclic structures, end groups and linking groups of the liquid crystals are shown in tables (I) and (II) below

TABLE I

| Corresponding code for ring structure | |
|---|---|
| Cyclic structure | Corresponding code |
|  | C |
| 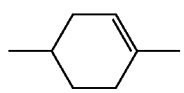 | C(V) |
| 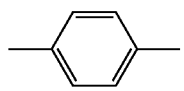 | B |
|  | B(2F,3F,4F) |
| 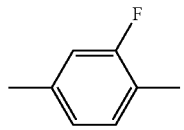 | B(3F) |

TABLE I-continued

| Corresponding code for ring structure | |
|---|---|
| Cyclic structure | Corresponding code |
| 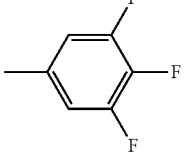 | B(3F,4F,5F) |
| 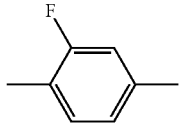 | B(2F) |
| 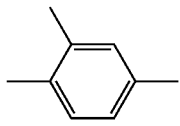 | B(2Me) |
| 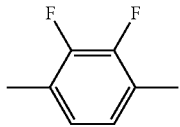 | B(2F,3F) |
|  | C[3O] |
| 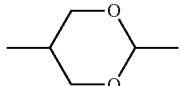 | C[3O,5O] |
| 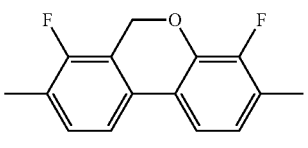 | Sa |
| 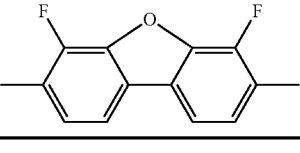 | Sc |

TABLE II

| Corresponding code for end group and linking group | |
|---|---|
| End groups and linking groups | Corresponding codes |
| $C_nH_{2n+1}$— | n |
| $C_nH_{2n+1}O$— | nO |
| —$OCF_3$ | $OCF_3$ |
| —$CF_3$ | $CF_3$ |
| —$CF_2O$— | $CF_2O$ |
| —$CH_2O$— | $CH_2O$ |
| —F | F |
| —CN | CN |
| —$CH_2CH_2$— | E |
| —CH=CH— | V |
| —C≡C— | W |
| —COO— | COO |
| —CH=CH—$C_nH_{2n+1}$ | Vn |

TABLE II-continued

Corresponding code for end group and linking group

| End groups and linking groups | Corresponding codes |
|---|---|
| (cyclopentyl) | C(5) |
| (cyclopropyl) | C(3) |
| —CH=CF$_2$ | V(F,F) |

EXAMPLES

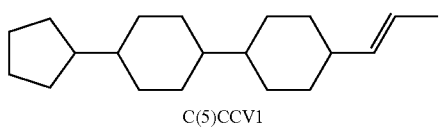

C(5)CCV1

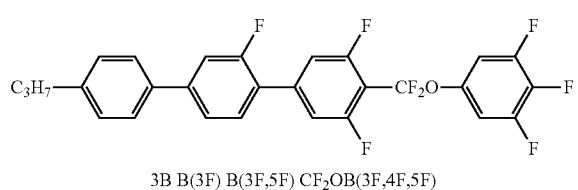

3B B(3F) B(3F,5F) CF$_2$OB(3F,4F,5F)

Example 1

Synthesis of

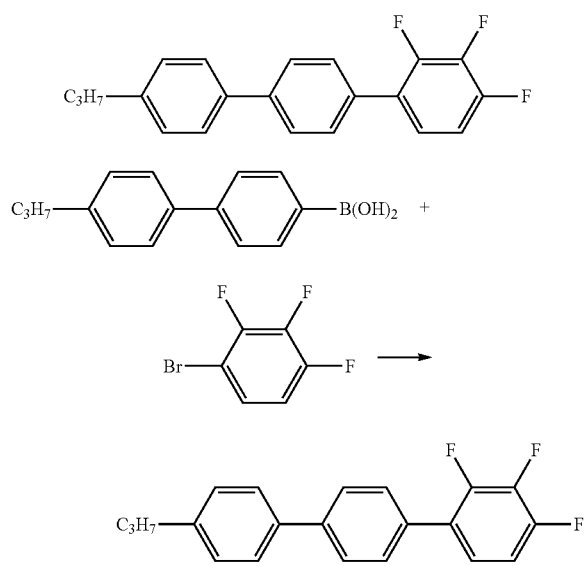

To a 1000 ml three-necked flask, 0.2 mol of propyl biphenyl boronic acid, 0.21 mol of 2,3,4-trifluorobromobenzene, 300 ml of toluene, 300 ml of ethanol, 200 ml of water, 0.24 mol of sodium carbonate and 1 g of tetrakis(triphenylphosphine)palladium are added and heated for a reflux reaction for 5 hours, followed by conventional treatments: dissolution with petroleum ether, passing through a silica gel column and recrystallization with anhydrous ethanol to obtain 49.4 g of a white crystal, with a yield of 76% and Gc: 99.91%.

Δn [589 nm, 25° C.]: 0.222
Cp: 106° C.
Δε [1 KHz, 25° C.]: 4.3

By means of similar synthesis processing, the following compounds can be obtained:

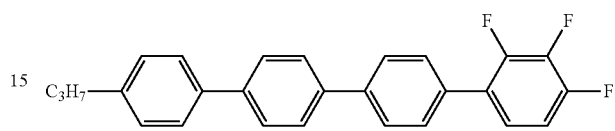

Δn [589 nm, 25° C.]: 0.332
Cp: 229° C.
Δε [1 KHz, 25° C.]: 6.9

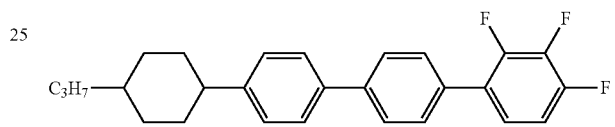

Δn [589 nm, 25° C.]: 0.250
Cp: 241° C.
Δε [1 KHz, 25° C.]: 6.8

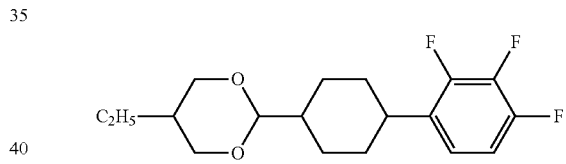

Δn [589 nm, 25° C.]: 0.091
Cp: 56° C.
Δε [1 KHz, 25° C.]: 15

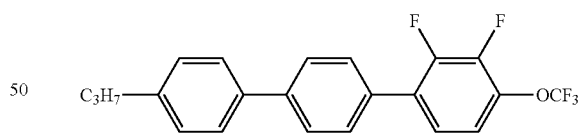

Δn [589 nm, 25° C.]: 0.340
Cp: 110° C.
Δε [1 KHz, 25° C.]: 9.3

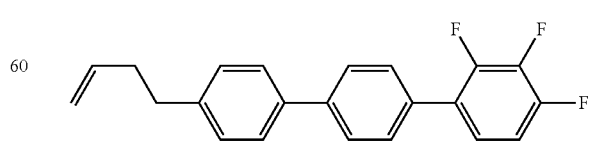

Δn [589 nm, 25° C.]: 0.242
Cp: 119° C.
Δε [1 KHz, 25° C.]: 7.3

Example 2

| Classification | Liquid crystal monomer codes | Content (%) |
| --- | --- | --- |
| I | 3CCB(2F,3F,4F) | 10 |
| I | 3CBB(2F,3F,4F) | 13 |
| I | 3CBBB(2F,3F,4F) | 5 |
| I | 3BBB(2F,3F,4F) | 14 |
| I | 3BBB(2F,3F)OCF3 | 8 |
| II-B | 3CCV | 50 |

$\Delta n$ [589 nm, 25° C.]: 0.105
Cp: 78° C.
$\Delta \varepsilon$ [1 KHz, 25° C.]: 2.3
$\gamma_1$: 56 mPa · s.

Example 3

| Classification | Liquid crystal monomer codes | Content (%) |
| --- | --- | --- |
| I | 3CCB(2F,3F,4F) | 5 |
| I | 3CBB(2F,3F,4F) | 3 |
| I | 3BBB(2F,3F,4F) | 5 |
| I | V2BBB(2F,3F,4F) | 4 |
| I | 3CBBB(2F,3F,4F) | 3 |
| II-B | 3CCV | 45 |
| II-B | 2CC3 | 5 |
| II | 5BB1 | 10 |
| III | 4BBB(2F,4F) | 5 |
| III | 3BB(3F,5F)CF2O B(2F,3F,4F) | 5 |
| III | 2BB(3F) B(3F,5F)CF2O B(2F,3F,4F) | 2 |
| III | 2C[3O]B B(3F,5F)CF2O B(2F,3F,4F) | 3 |
| III | 4BB(3F) B(3F,5F)CF2O B OCF3 | 5 |

$\Delta n$ [589 nm, 25° C.]: 0.0988
Cp: 79° C.
$\Delta \varepsilon$ [1 KHz, 25° C.]: 5.1
$\gamma_1$: 48.5 mPa · s.

Example 4

| Classification | Liquid crystal monomer codes | Content (%) |
| --- | --- | --- |
| I | 3CBB(2F,3F,4F) | 7 |
| I | 3BBB(2F,3F,4F) | 10 |
| I | 3CCB(2F,3F,4F) | 5 |
| II | 3CCV | 50 |
| II | 4BB2V | 9 |
| III | H(5)BB(3F,5F)CF2OB(3F,4F,5F) | 6 |
| III | 2C(3O)BB(3F,5F)CF2OB(3F,4F,5F) | 3 |
| III | 4BB(3F)B(3F,5F)CF2OB(4F) | 10 |

$\Delta n$ [589 nm, 25° C.]: 0.109
Cp: 75° C.
$\Delta \varepsilon$ [1 KHz, 25° C.]: 5.6
$\gamma_1$: 65 mPa · s.

Comparative Example 1

By replacing the compound 3CBB(2F,3F,4F) of formula I in Example 4 with common 3CBB(3F,4F,5F), 3BBB(2F,3F,4F) with common 3BBB(3F,4F,5F), and 3CCB(2F,3F,4F) with common 3CCB(3F,4F,5F), a composition of Comparative Example 1 is obtained, $\varepsilon_\perp$ being reduced from 3.8 to 3.1, and after the transmissivity thereof is tested, the transmissivity of the composition of Comparative Example 1 is reduced by 8% compared with that of Example 4.

Example 5

| Classification | Liquid crystal monomer codes | Content (%) |
| --- | --- | --- |
| I | 3BBB(2F,3F,4F) | 5 |
| II | 3CCV | 35 |
| II | 2CB3 | 10 |
| III | C(5)BB(3F,5F)CF2O B(3F,4F,5F) | 7 |
| III | C(5)C(3O)BB(3F,5F)CF2OB(3F,4F,5F) | 3 |
| III | 2BB(3F,5F)CF2OB(3F,4F,5F) | 5 |
| IV | 4CCB3 | 10 |
| IV | 3CCB(3F)2 | 5 |
| IV | 2CBBC4 | 5 |
| V | 5CCB(4F) | 5 |
| V | 2CBB(3F,4F) | 5 |
| V | 4CCBOCF3 | 5 |

$\Delta n$ [589 nm, 25° C.]: 0.116
Cp: 114° C.
$\Delta \varepsilon$ [1 KHz, 25° C.]: 5.67
$\gamma_1$: 139 mPa · s.

Example 6

| Classification | Liquid crystal monomer codes | Content (%) |
| --- | --- | --- |
| I | 3CBB(2F,3F,4F) | 6 |
| II | 3CCV | 40 |
| II | 4VBO2 | 10 |
| III | 3BB(3F,5F)CF2OB(3F,4F,5F) | 4 |
| III | 3C(3O,5O)BB(3F,5F)CF2OB(3F,4F,5F) | 3 |
| III | C(5)BB(3F,5F)CF2O B(3F,4F,5F) | 4 |
| IV | 2CCB4 | 7 |
| IV | 4CB(3F)B4 | 6 |
| IV | C(3)1BB(3F)B3 | 5 |
| VI | 2CB(2F,3F)O1 | 5 |
| VI | 2BB(2F,3F)O3 | 5 |
| VI | 2CCB(2F,3F)O1 | 5 |

$\Delta n$ [589 nm, 25° C.]: 0.1168
Cp: 88.2° C.
$\Delta \varepsilon$ [1 KHz, 25° C.]: 2.51
$\gamma_1$: 142.6 mPa · s.

Example 7

| Classification | Liquid crystal monomer codes | Content (%) |
| --- | --- | --- |
| I | V2BBB(2F,3F,4F) | 5 |
| II | 3CCV | 35 |
| II | 2CB3 | 10 |
| III | C(5)BB(3F,5F)CF2OB(3F,4F,5F) | 7 |
| III | C(5)BB(3F)B(3F,5F)CF2 B(3F,4F,5F) | 3 |
| III | 2BB(3F,5F)CF2OB(3F,4F,5F) | 5 |
| IV | 4CCB3 | 10 |
| IV | 3CCB(3F)2 | 5 |
| IV | 2CBBC4 | 5 |
| V | 5CCB(4F) | 5 |
| V | 2CBB(3F,4F) | 5 |
| V | 4CCBOCF3 | 5 |

$\Delta n$ [589 nm, 25° C.]: 0.136
Cp: 115° C.
$\Delta \varepsilon$ [1 KHz, 25° C.]: 5.25
$\gamma_1$: 105.6 mPa · s.

The liquid crystal compound of the present invention has a lower viscosity, better stability to light and heat, and is suitable for adjusting a quickly responsive liquid crystal compound having a high transmittance.

The liquid crystal composition of the present invention has a lower viscosity, better stability to light and heat, a wider refractive index, a wider nematic phase temperature range, and excellent properties in adjusting a quick response and high transmittance, and is particularly suitable for an IPS mode.

The invention claimed is:
1. A liquid crystal composition, wherein the liquid crystal composition comprises one or more compounds of formula I and one or two compounds of formula II-B,

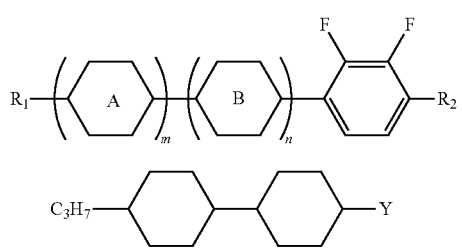

wherein $R_1$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more non-connected $CH_2$ in the groups represented by $R_1$ may be substituted with cyclobutyl, cyclopropyl or —O—;
Y represents ethyl or vinyl;
$R_2$ represents F, $OCF_3$, $OCHF_2$ or $OCH_2F$;

each independently represent one of

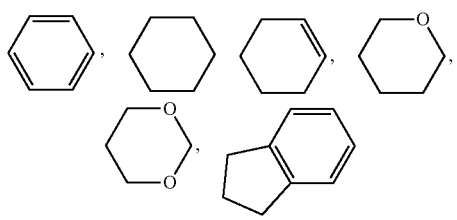

and any fluorobenzene; and
m and n each independently represent 1 or 2.
2. The liquid crystal composition according to claim 1, wherein said one or more compounds represented by formula I are one or more of compounds represented by formulas I1 to I24;
said liquid crystal composition further comprises one or more compounds represented by formulas II1 to II10;
and said one or two compounds represented by formula II-B are one or two of compounds represented by formulas II-B-1 and II-B-2;

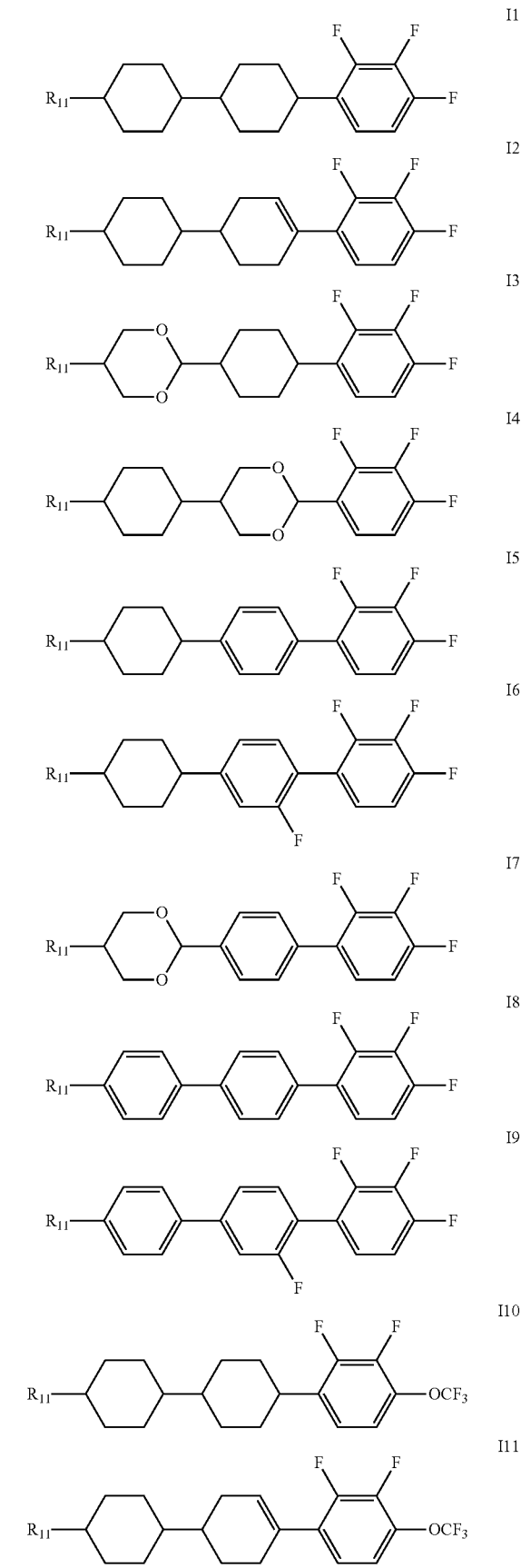

I12
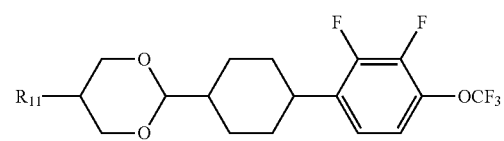
I13
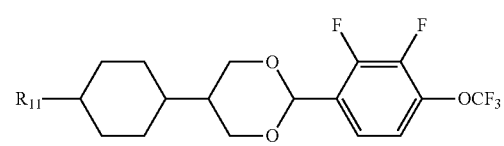
I14
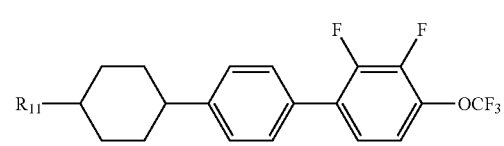
I15
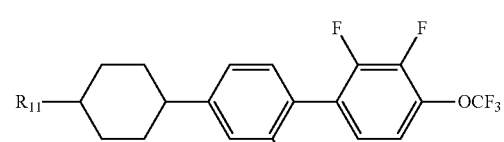
I16
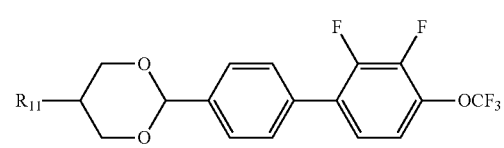
I17
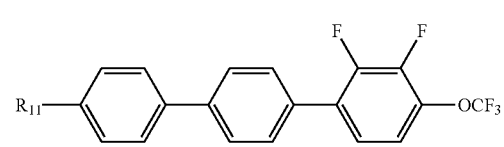
I18
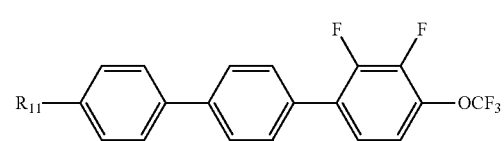
I19
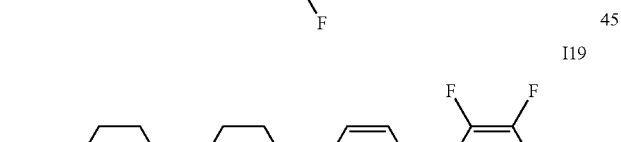
I20
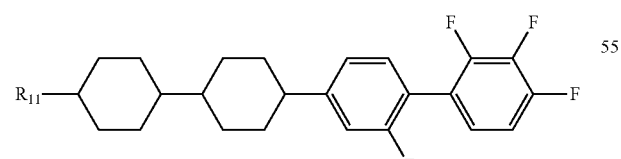
I21
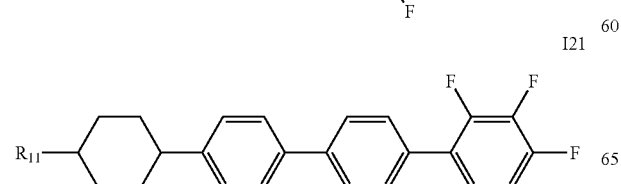
I22
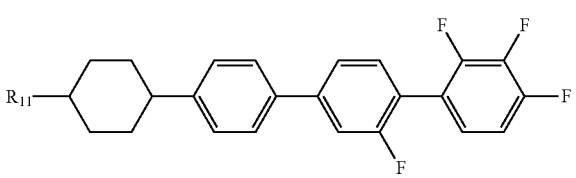
I23
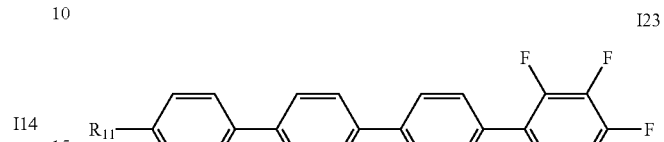
I24
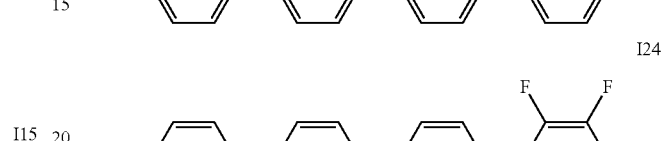
II-B-1
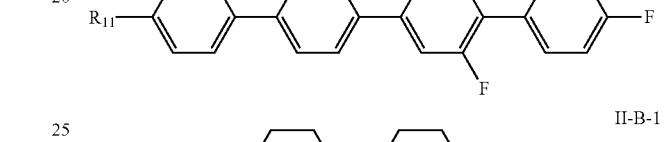
II-B-2
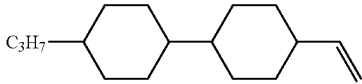
II-1
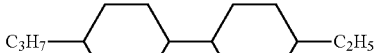
II-2
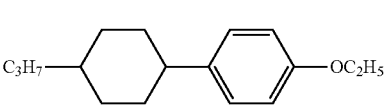
II-3
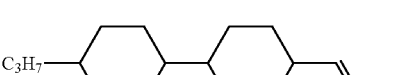
II-4
II-5
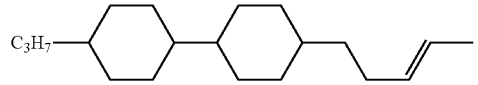
II-6
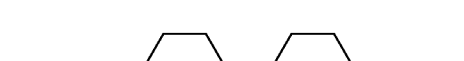
II-7
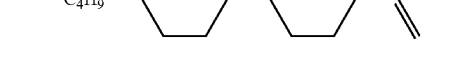
II-8
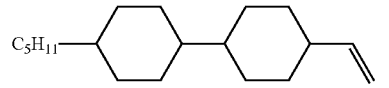

-continued

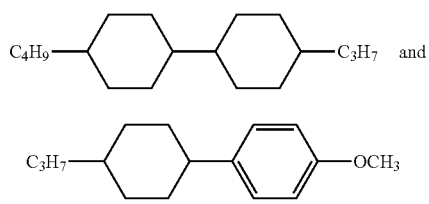

wherein R$_{11}$ each independently represents an alkyl having a carbon atom number of 1-6 or an alkenyl group having an atom number of 2-6.

3. The liquid crystal composition according to claim 1, wherein in said liquid crystal composition, the total content in mass percentage of the compounds represented by formula I is 0.5-50%, the total content in mass percentage of the compounds represented by formula II-B is 5-65%.

4. The liquid crystal composition according to claim 1, wherein said liquid crystal composition is a positive liquid crystal composition, and said liquid crystal composition further comprises one or more compounds represented by formula III

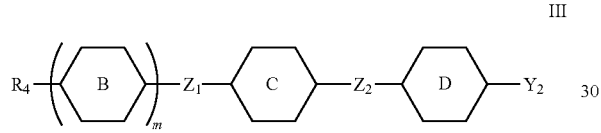

wherein R$_4$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8; and any one or more CH$_2$ in the groups represented by R$_4$ may be substituted with cyclopentyl, cyclobutyl or cyclopropyl;

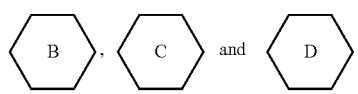

each independently represent:
one or two of

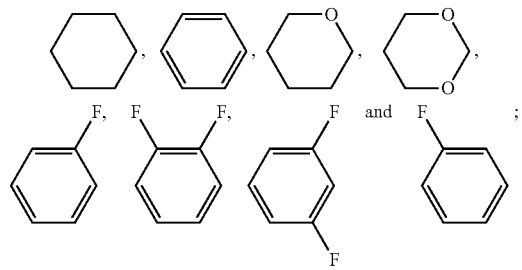

m represents 1 or 2;

Z$_1$ and Z$_2$ each independently represent a single bond, —CF$_2$O—, —CH$_2$CH$_2$— or —CH$_2$O—; and Y$_2$ represents F, a fluoro-substituted alkyl group having a carbon atom number of 1-5, a fluoro-substituted alkoxy group having a carbon atom number of 1-5, a fluoro-substituted alkenyl group having a carbon atom number of 2-5, or a fluoro-substituted alkenoxy group having a carbon atom number of 3-8.

5. The liquid crystal composition according to claim 4, wherein said one or more compounds represented by formula III are one or more of compounds represented by formulae III1 to III26

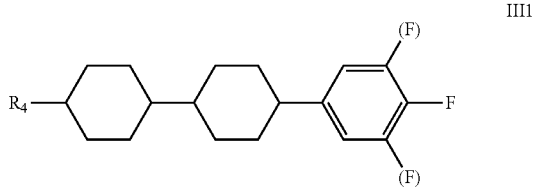

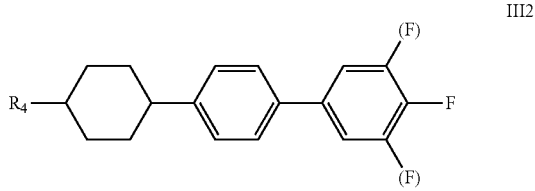

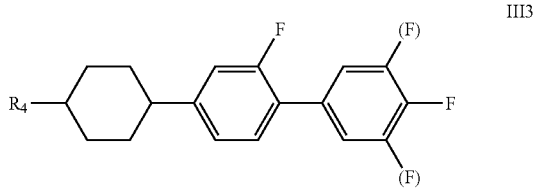

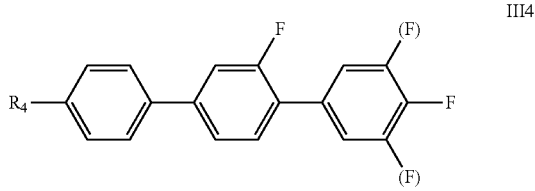

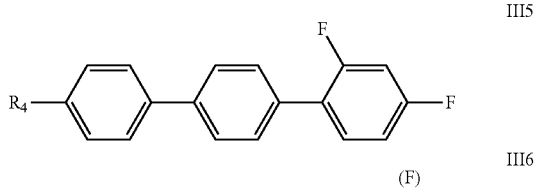

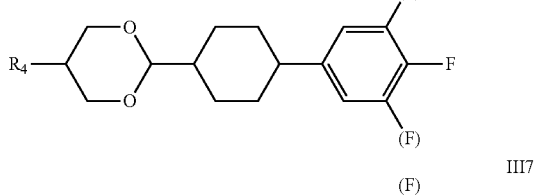

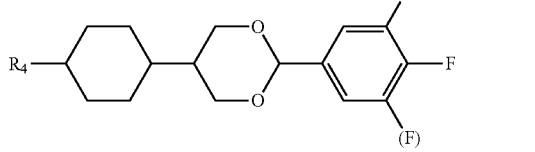

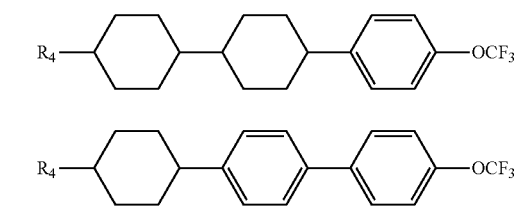 III8
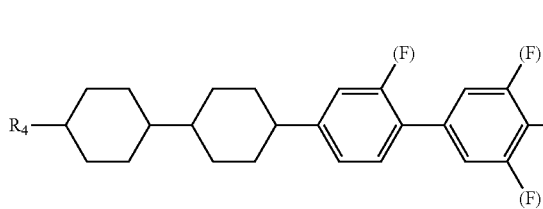 III9
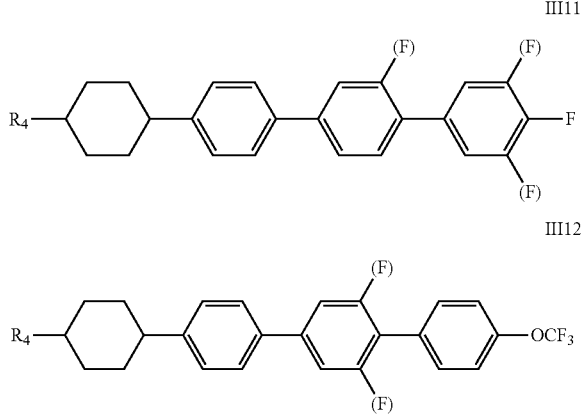 III10
III11
III12
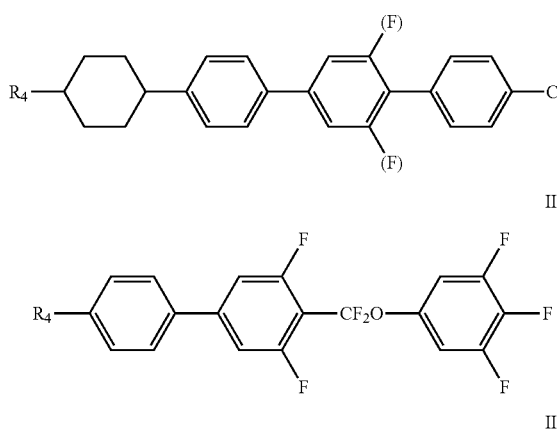 III13
III14
III15
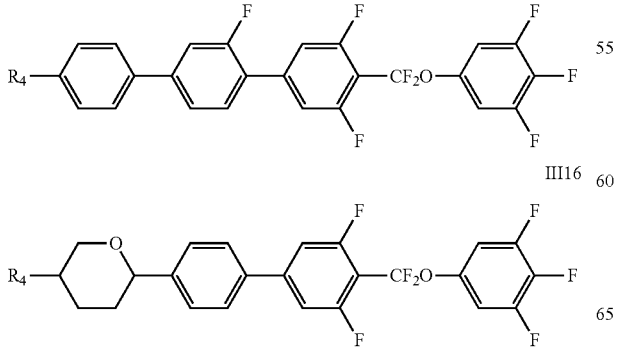 III16
 III17
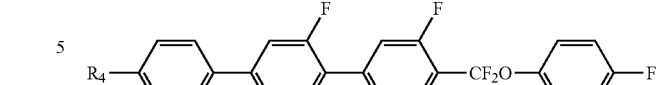 III18
III19
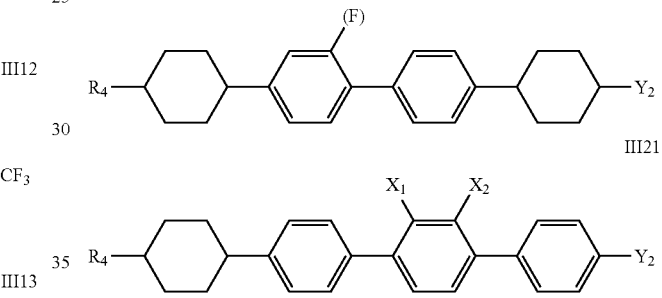 III20
III21
III22
III23
III24
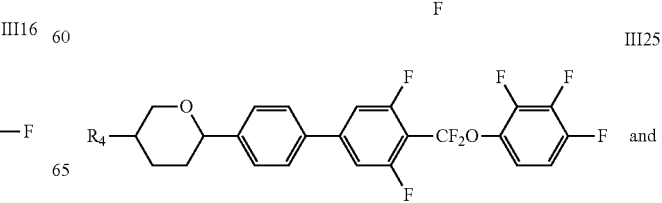 III25 and -continued

III26

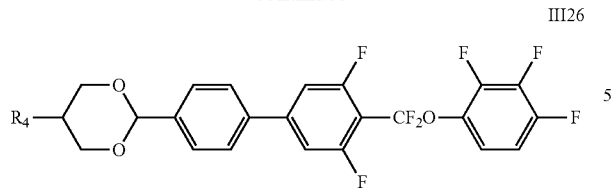

wherein X₁ and X₂ each independently represent H or F, but can be neither F nor H at the same time in the same molecular formula;

R₄ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any CH₂ in the groups represented by R₄ may be substituted with cyclopentyl, cyclobutyl or cyclopropyl;

the (F)s each independently represent H or F; and

Y₂ each independently represents F, a fluoro-substituted alkyl group having a carbon atom number of 1-5, a fluoro-substituted alkoxy group having a carbon atom number of 1-5, a fluoro-substituted alkenyl group having a carbon atom number of 2-5, or a fluoro-substituted alkenoxy group having a carbon atom number of 3-8.

6. The liquid crystal composition according to claim 1, wherein said liquid crystal composition is a negative liquid crystal composition, and said liquid crystal composition further comprises one or more compounds represented by formula IV

IV

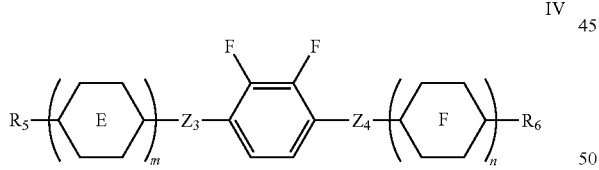

wherein R₅ and R₆ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any CH₂ in the groups represented by R₅ and R₆ may be substituted with cyclopentyl, cyclobutyl or cyclopropyl;

Z₃ and Z₄ each independently represent a single bond, —CH₂CH₂— or —CH₂O—;

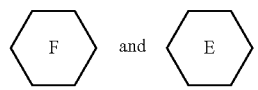

each independently represent one or more of

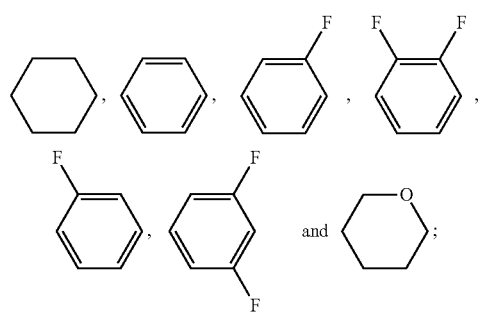

m represents 1 or 2;

n represents 0, 1 or 2.

7. The liquid crystal composition according to claim 6, wherein said one or more compounds represented by formula IV are one or more of compounds represented by formulae IV1 to IV11

IV1
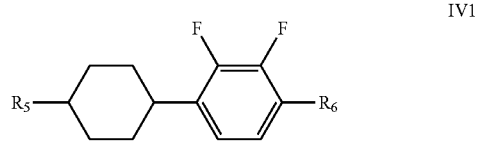

IV2
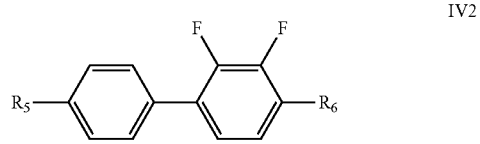

IV3
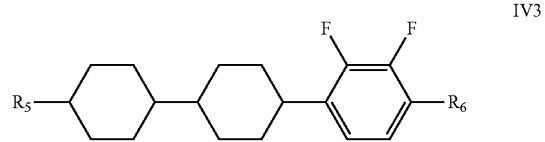

IV4
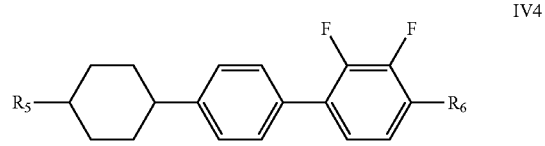

IV5
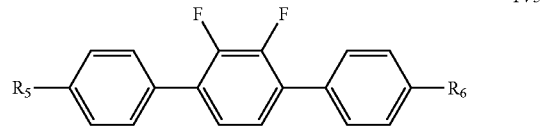

IV6
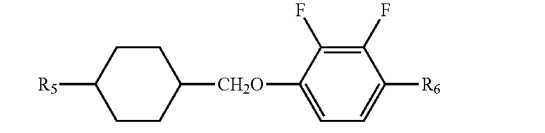

-continued

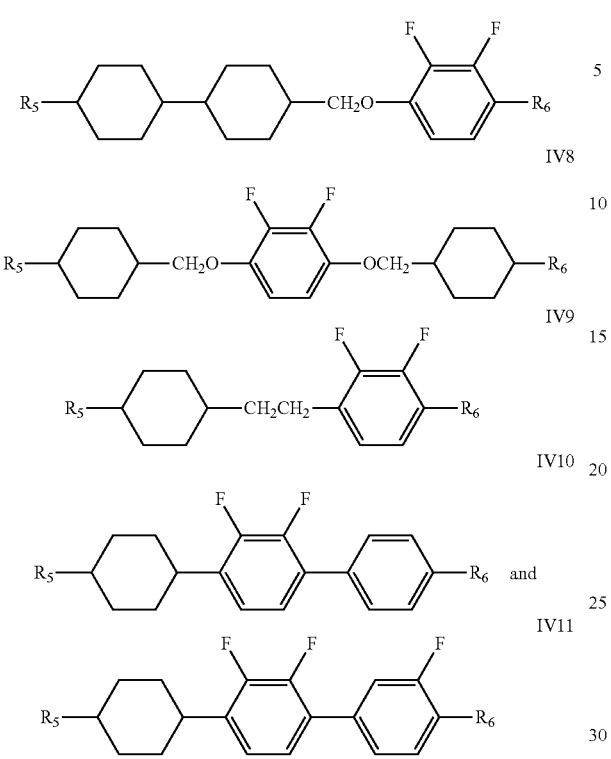

wherein $R_5$ and $R_6$ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any $CH_2$ in the groups represented by $R_5$ and $R_6$ may be substituted with cyclopentyl, cyclobutyl or cyclopropyl.

8. The liquid crystal composition according to claim 1, wherein said liquid crystal composition is a negative liquid crystal composition, and said liquid crystal composition further comprises one or more compounds represented by formula V

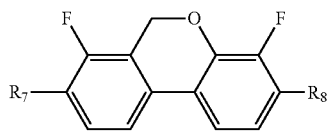

wherein $R_7$ and $R_8$ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any $CH_2$ in the groups represented by $R_7$ and $R_8$ may be substituted with cyclopentyl, cyclobutyl or cyclopropyl.

9. The liquid crystal composition according to claim 4, wherein said liquid crystal composition further comprises one or more compounds represented by formula VI

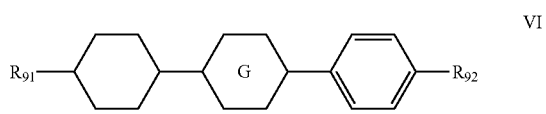

wherein $R_{91}$ represents an alkyl group having a carbon atom number of 1-5 or an alkenyl group having a carbon atom number of 2-5;

$R_{92}$ represents an alkyl group having a carbon atom number of 1-5, an alkoxy group having a carbon atom number of 1-5 or an alkenyl group having a carbon atom number of 2-5; and

represents

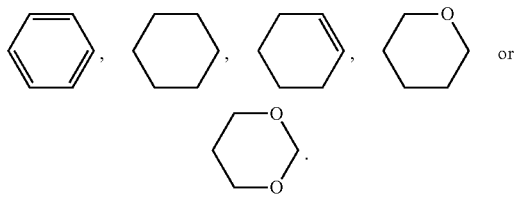

10. A compound, represented by formula I2-I4, I6-I13, I15, I16, or I18-I24:

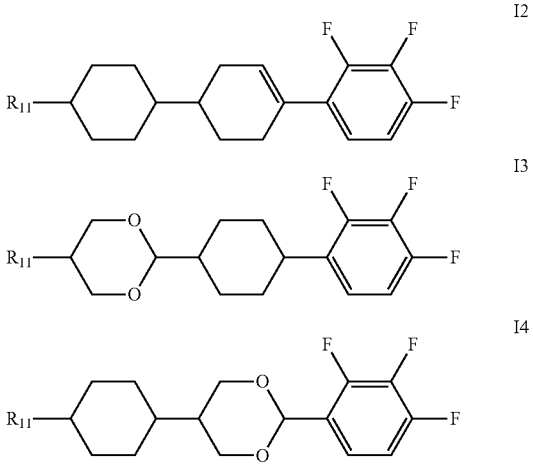

I6 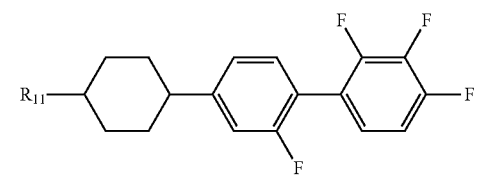

I7 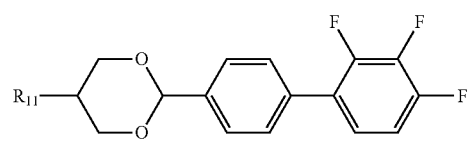

I8 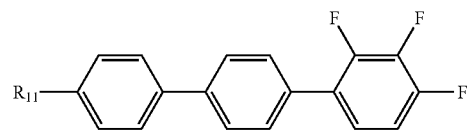

I9 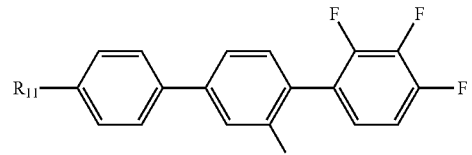

I10 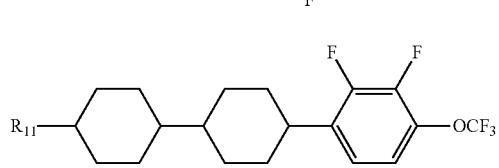

I11 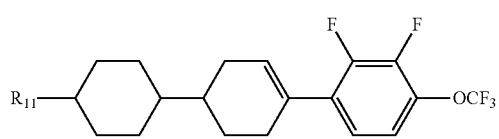

I12 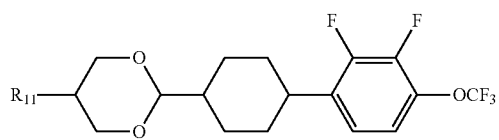

I13 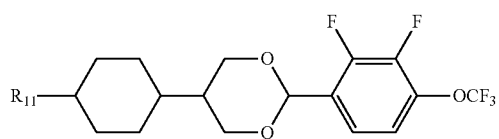

I15 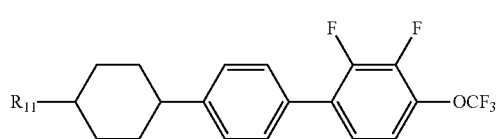

I16 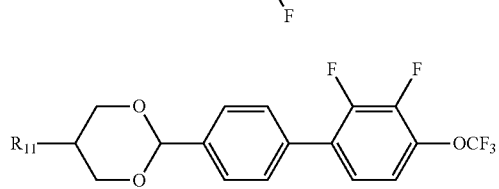

I18 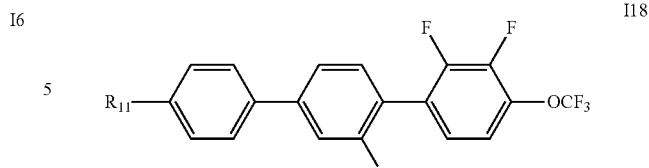

I19 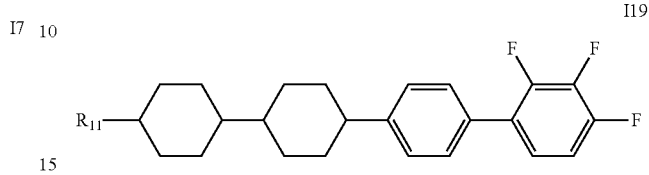

I20 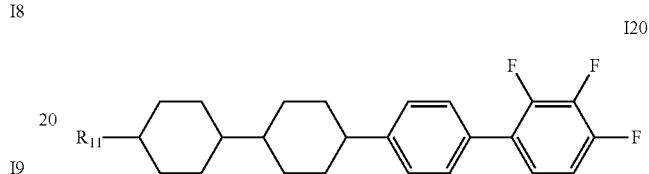

I21 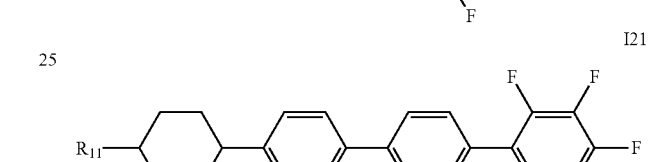

I22 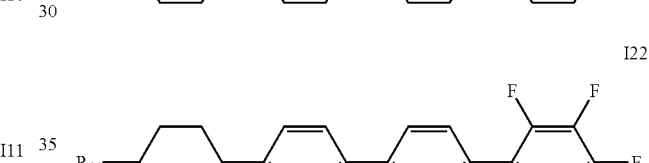

I23 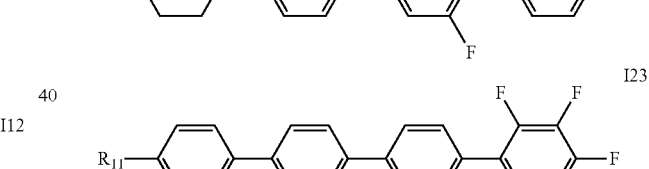

I24 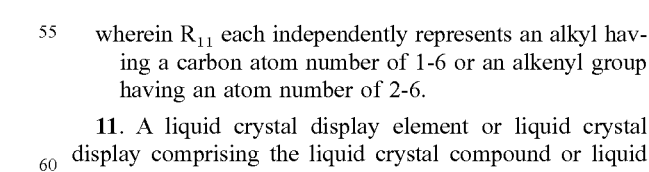

wherein $R_{11}$ each independently represents an alkyl having a carbon atom number of 1-6 or an alkenyl group having an atom number of 2-6.

11. A liquid crystal display element or liquid crystal display comprising the liquid crystal compound or liquid crystal composition of claim 1, wherein said liquid crystal display element or liquid crystal display is an active matrix display element or display or a passive matrix display element or display.

12. The liquid crystal composition according to claim 6, wherein said liquid crystal composition further comprises one or more compounds represented by formula VI

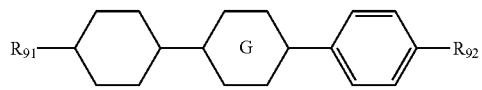 VI wherein $R_{91}$ represents an alkyl group having a carbon atom number of 1-5 or an alkenyl group having a carbon atom number of 2-5;

$R_{92}$ represents an alkyl group having a carbon atom number of 1-5, an alkoxy group having a carbon atom number of 1-5 or an alkenyl group having a carbon atom number of 2-5; and

represents

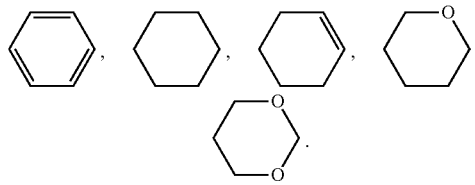 or

13. The liquid crystal composition according to claim 8, wherein said liquid crystal composition further comprises one or more compounds represented by formula VI

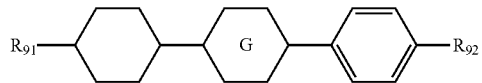 VI wherein $R_{91}$ represents an alkyl group having a carbon atom number of 1-5 or an alkenyl group having a carbon atom number of 2-5;

$R_{92}$ represents an alkyl group having a carbon atom number of 1-5, an alkoxy group having a carbon atom number of 1-5 or an alkenyl group having a carbon atom number of 2-5; and

represents

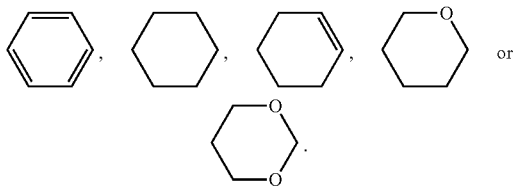 or

14. A liquid crystal display element or liquid crystal display comprising the compound of claim 10, wherein said liquid crystal display element or liquid crystal display is an active matrix display element or display or a passive matrix display element or display.

15. The liquid crystal composition according to claim 2, wherein in said liquid crystal composition, the total content in mass percentage of the compounds represented by formula I is 0.5-50%, the total content in mass percentage of the compounds represented by formula II-B is 5-65%, and the total content in mass percentage of the compounds represented by formula II-1~II-10 is no more than 30%.

* * * * *